(12) United States Patent
Koul et al.

(10) Patent No.: US 8,804,825 B2
(45) Date of Patent: Aug. 12, 2014

(54) BI-PRED MODE DECISION IN GOP ARCHITECTURE

(75) Inventors: Ashish Koul, Cambridge, MA (US); Douglas Chin, Windham, NH (US)

(73) Assignee: Broadcom Corporation, Irvine, CA (US)

( * ) Notice: Subject to any disclaimer, the term of this patent is extended or adjusted under 35 U.S.C. 154(b) by 1332 days.

(21) Appl. No.: 11/329,603

(22) Filed: Jan. 11, 2006

(65) Prior Publication Data

US 2006/0262850 A1  Nov. 23, 2006

Related U.S. Application Data

(63) Continuation-in-part of application No. 11/154,032, filed on Jun. 16, 2005, now Pat. No. 7,848,428.

(60) Provisional application No. 60/580,950, filed on Jun. 17, 2004.

(51) Int. Cl.
    *H04N 7/12* (2006.01)

(52) U.S. Cl.
    USPC ........... 375/240.12; 375/240.16; 375/E7.243; 375/E7.211; 375/240.14; 375/E7.125; 375/E7.262; 375/E7.133; 375/240.01; 375/E7.123; 375/E7.25; 375/240.15; 375/E7.148; 375/E7.181; 375/E7.105; 375/240.13; 375/E7.146; 375/E7.161; 375/E7.255; 375/E7.257; 375/E7.138; 375/E7.076; 375/E7.149; 375/E7.124; 375/E7.209; 375/E7.265; 375/240.1; 375/E7.137; 375/E7.17; 375/E7.03; 375/E7.151; 375/E7.147; 375/E7.171; 375/E7.078; 375/E7.15; 375/E7.179; 375/E7.266; 375/E7.016; 375/E7.083; 375/E7.115; 382/236; 382/239; 382/248; 348/699; 348/416.1; 348/420.1; 348/E5.062; 348/415.1; 348/E5.112; 348/E7.003; 348/14.15; 348/388.1; 348/400.1; 348/402.1; 348/413.1; 348/46; 348/329

(58) Field of Classification Search
    USPC ........... 375/E7.151, E7.179, 240.15, 240.16, 375/240.12, E7.211, E7.124, E7.243, 375/240.14, E7.125, E7.262, E7.133, 375/240.01, E7.123, E7.25, E7.148, 375/E7.181, E7.105, 240.13, E7.146, 375/E7.161, E7.255, E7.257, E7.138, 375/E7.076, E7.149, E7.2, E7.209, E7.265, 375/240.1, E7.137, E7.17, E7.03, E7.147, 375/E7.169, E7.171, E7.078; 382/236, 239, 382/248; 348/699, 416.1, 420.1, E13.074, 348/E5.062, 415.1, E5.112, E7.003, 1, 348/4.15, 388.1, 400.1, 402.1, 412.1, 413.1, 348/46, 329
    See application file for complete search history.

(56) References Cited

U.S. PATENT DOCUMENTS

| | | | |
|---|---|---|---|
| 6,072,831 A * | 6/2000 | Chen | 375/240.03 |
| 6,118,818 A * | 9/2000 | Min et al. | 375/240.12 |
| 6,546,050 B2 * | 4/2003 | Ramaswamy | 375/240.03 |
| 2004/0048605 A1 | 3/2004 | Schaefer | |
| 2004/0189474 A1 | 9/2004 | Borovoy | |
| 2004/0203363 A1 | 10/2004 | Carlton | |
| 2005/0188010 A1 | 8/2005 | Valk | |
| 2005/0281329 A1 * | 12/2005 | Chin | 375/240.01 |

FOREIGN PATENT DOCUMENTS

DE    100 53 825    5/2002

OTHER PUBLICATIONS match.com.
smallplanet.com.
speeddater.co.uk.
sprintusers.com.
webdatemobile.com.
dodgeball.com.
jambo.com.
mamjam.com.
worldsinglesmobile.com.
itsjustlunch.com.

hurrydate.com.
8minutedating.com.
cupid.com.
lockandkeyevents.com.
joesclub.com.
samanthastable.com.
profiledoctor.com.
relationshipexchange.com.
Wireless Firms Move Into Social Networking.

\* cited by examiner

*Primary Examiner* — Daniel Washburn
*Assistant Examiner* — Rahel Guarino
(74) *Attorney, Agent, or Firm* — Foley & Lardner LLP

(57) ABSTRACT

A method for encoding pictures within a groups of pictures using prediction, where a first reference picture from a group of pictures and a second reference pictures from the subsequent group of pictures are used in predicting pictures in the group of pictures associated with the first reference picture. A plurality of anchor pictures in the group of pictures associated with the first reference picture may be predicted using both the first and second reference pictures to ensure a smooth transition between different groups of pictures within a video frame.

20 Claims, 5 Drawing Sheets

BI-PRED MODE DECISION IN GOP ARCHITECTURE

RELATED APPLICATIONS

The application makes reference to, claims priority to, and claims the benefit of U.S. Provisional Application Ser. No. 60/681,698 filed on May 17, 2005.

This application also makes reference to U.S. Provisional Patent Application No. 60/580,950 filed Jun. 17, 2004.

The above stated applications are hereby incorporated herein by reference in their entirety.

This application is a continuation-in-part of application Ser. No. 11/154,032, filed Jun. 16, 2005 by Chin, now U.S. Pat. No. 7,848,428 published as U.S. Patent Application Pub. No. 2005/0281329, and now issued as U.S. Pat. No. 7,848, 428, which claims the benefit of and priority to U.S. Provisional Application No. 60/580,950, filed on Jun. 17, 2004.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video encoders encode a video bit-stream according to a predetermined standard syntax, such as MPEG-2 or Advanced Video Compression (AVC). An encoder generating a compressed video bit-stream makes a number of choices for converting the video stream into a compressed video bit-stream that satisfies the quality of service and bit-rate requirements of a channel and media. Often, video data is transferred over a communication channel, with limited bandwidth, thus requiring compression on the encoder side.

One of the problems associated with compression is that it is a lossy process. Since compression discards some information in the video data, the discarded information is not recoverable. Other problems arise as a result.

To illustrate, consider, for example, an MPEG encoding process where video data comprises a series of frames. Each frame comprises two-dimensional grids of pixels. The two-dimensional grids are divided into smaller blocks of pixels, such as 16×16 blocks of pixels. These 16×16 blocks of pixels form a data structure known as a macroblock. The macroblock includes luminance and chrominance information, as well as additional parameters, including motion vectors. Each macroblock represents image data in a 16×16 block area of the image.

The data in the macroblocks is compressed in accordance with algorithms that take advantage of temporal and spatial redundancies. The macroblocks representing a frame are grouped into different slice groups. The slice group includes the macroblocks, as well as additional parameters describing the slice group. Each of the slice groups forming the frame forms the data portion of a picture structure. The picture includes the slice groups as well as additional parameters that further define the picture.

The pictures are then grouped together as a group of pictures (GOP). The GOP also includes additional parameters further describing the GOP. Groups of pictures are then stored, forming what is known as a video elementary stream (VES). The VES is then packetized to form a packetized elementary sequence. Each packet is then associated with a transport header, forming what are known as transport packets.

The transport packets can be multiplexed with other transport packets carrying other content, such as another video elementary stream or an audio elementary stream. The multiplexed transport packets form what is known as a transport stream. The transport stream is transmitted over a communication medium for decoding and displaying.

A group of pictures comprises reference pictures I and P, and bi-directional pictures B. Pictures coded using temporal redundancy with respect to exclusively earlier pictures of the video sequence are known as predicted pictures (or P-pictures). Pictures coded using temporal redundancy with respect to earlier and/or later pictures of the video sequence are known as bi-directional pictures (or B-pictures). Pictures not coded using temporal redundancy are known as I-pictures. In the MPEG-2 standard, I-pictures and P-pictures are also referred to as reference pictures.

A GOP generally starts with an I picture, followed by B and P pictures, up to the end of the GOP, where another GOP begins with another I pictures. Often, GOPs represent adjacent parts of a video sequence. In each GOP, B or P pictures are typically encoded using the I pictures associated with the GOP. When the next GOP begins, the pictures are encoded using the new I. Problems arise because of the time gap between one I picture and the next I picture. The pictures in one GOP are coded based on the I picture in the beginning of the GOP, and all of a sudden the pictures in the next GOP begins with an I picture that is relatively later in time from the earlier I picture. While in an original video sequence the change from the first I picture to the next I picture has a smooth transition, coding the B pictures based on the preceding I picture causes visible interruption in the transition between consecutive GOPs. This is known as "I-clicking" and may be seen in areas within a picture with a lot of detail such as, for example, a picture with wood texture.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a bi-pred mode decision in GOP architecture, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention relate to video processing. More specifically, certain embodiments of the present invention relate to encoding video data using prediction methods. While the following discusses aspects of the present invention in association with video data, it should be understood that embodiments of the present invention may be applicable in systems utilizing compression and/or quantization methods that may result in loss of detail from the processed data.

Figure 1:
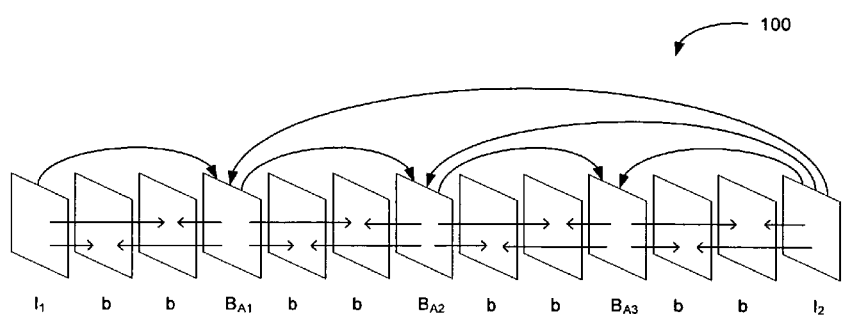
FIG. 1 illustrates an exemplary encoding of a group of pictures, in accordance with an embodiment of the present invention.

FIG. 1 illustrates an exemplary encoding of a group of pictures, in accordance with an embodiment of the present invention. In a GOP 100, a reference picture such as, for example, picture $B_{A2}$ can be temporally coded using a reference picture from another GOP such as, for example, reference picture $I_2$. Other reference pictures at predetermined intervals within the GOP 100 such as, for example, reference pictures $B_{A1}$ and $B_{A3}$ can be temporally coded using a reference picture from another GOP, i.e., $I_2$. The remaining pictures in the GOP 100 can be temporally encoded using the preceding and/or subsequent reference pictures.

To illustrate, consider the GOP 100, where anchor B pictures, $B_A$, may be encoded such that the anchor B pictures closer to the subsequent GOP may utilize the I picture of the subsequent GOP. In a linear GOP, 100, the first anchor B picture, $B_{A1}$ may be encoded using $I_1$ and $I_2$, where $I_1$ may be the reference picture of GOP 100, and $I_2$ may be the reference picture of the following GOP. $B_{A2}$ may be encoded using $B_{A1}$ and $I_2$, and $B_{A3}$ may be encoded using $B_{A2}$ and $I_2$. The remaining B pictures, indicated by b, may then be encoded using the preceding I picture and the anchor B pictures, and as a result, the B pictures may be encoded using reference pictures containing information from both $I_1$ and $I_2$ and consequently a smooth transition may result between adjacent GOPs. Both I and anchor B pictures can be considered reference pictures, where I pictures may be considered primary reference pictures and anchor B pictures may be considered secondary reference pictures.

Figure 2:
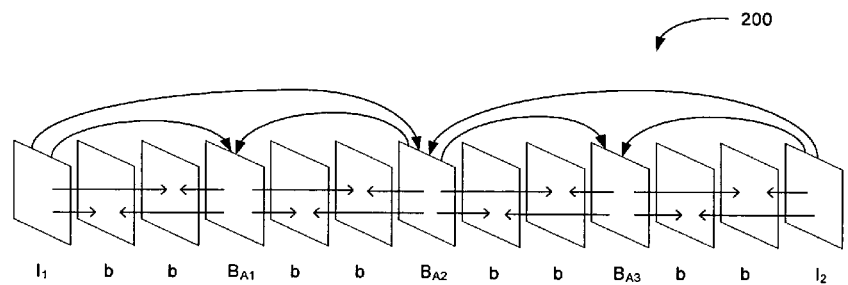
FIG. 2 illustrates another exemplary encoding of a group of pictures, in accordance with an embodiment of the present invention.

FIG. 2 illustrates another exemplary encoding of a group of pictures, in accordance with an embodiment of the present invention. In a GOP 200, a reference picture such as, for example, picture $B_{A2}$ can be temporally coded using a reference picture from another GOP such as, for example, reference picture $I_2$. Other reference pictures at predetermined intervals within the GOP 200 such as, for example, reference pictures $B_{A1}$ and $B_{A3}$ can be temporally coded using the preceding reference picture and the subsequent reference picture. The remaining pictures in the GOP 200 can be also temporally encoded using the preceding and/or subsequent reference pictures.

To illustrate, consider the GOP 200, where anchor B pictures, $B_A$, may be encoded such that the anchor B pictures closer to the subsequent GOP may utilize the I picture of the subsequent GOP. In a multi-level GOP, 200, the first anchor B picture, $B_{A1}$ may be encoded using a preceding I picture and the second anchor B picture, $I_1$ and $B_{A2}$, respectively. The second anchor B picture, $B_{A2}$ may be encoded using the preceding and the subsequent I pictures, $I_1$ and $I_2$, respectively, where $I_1$ may be the reference picture of GOP 200, and $I_2$ may be the reference picture of the following GOP. $B_{A3}$ may be encoded using $B_{A2}$ and $I_2$. The remaining B pictures, indicated by b, may then be encoded using the preceding I picture and the anchor B pictures, and as a result, the B pictures, b, may be encoded using reference pictures containing information from both $I_1$ and $I_2$ and consequently a smooth transition may result between adjacent GOPs.

Figure 3:
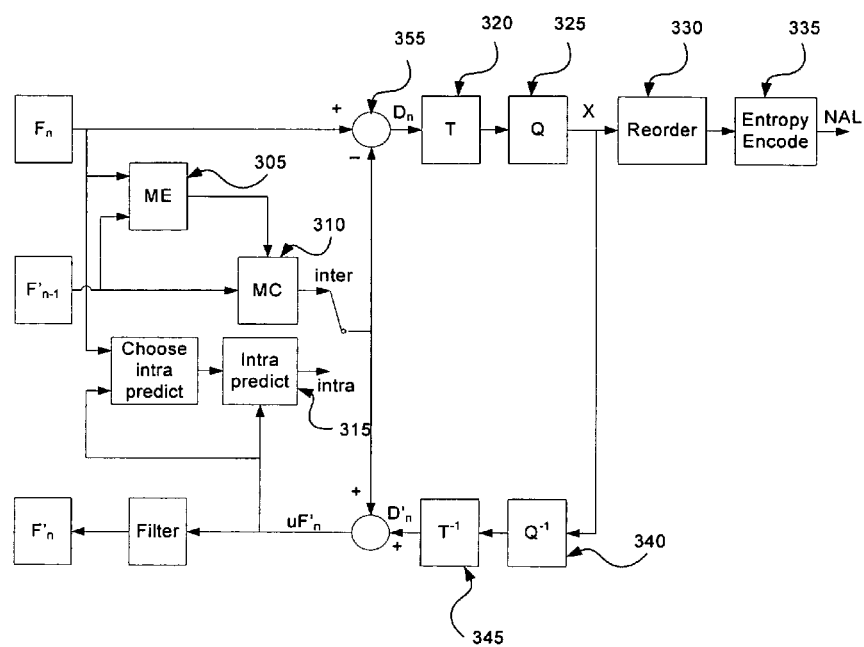
FIG. 3 illustrates a block diagram of an exemplary video encoder, in accordance with an embodiment of the present invention.

FIG. 3 illustrates a block diagram of an exemplary video encoder, in accordance with an embodiment of the present invention. The video encoder encodes video data comprising a set of frames $F_0 \ldots F_n$. The video encoder may comprise motion estimators 305, motion compensators 310, spatial predictors 315, transformation engine 320, quantizer 325, scanner 330, entropy encoders 335, inverse quantizer 340, and inverse transformation engine 345. The foregoing may comprise hardware accelerator units under the control of a CPU.

In an embodiment of the present invention, in temporal prediction mode, the motion estimators 305 and motion compensators 310 form a prediction macroblock from one or more reference frames. Additionally, the motion estimators 305 and motion compensators 310 provide motion vectors identifying the prediction block. The motion estimators 305, in identifying prediction blocks for a picture in a group of pictures, may check an earlier picture and/or a later picture, where the earlier and the later picture may be a reference, I picture or an anchor B, $B_A$ picture.

The motion estimators 305 and motion compensators 310 may utilize, in encoding an anchor picture using prediction block from an earlier and/or a later picture. In one embodiment of the present invention, the motion estimators 305 and motion compensators 310 may use a prediction block from an earlier picture or a later picture based on a decision made as to which may yield a better result. In another embodiment of the present invention, the motion estimators 305 and motion compensators 310 may use a prediction block from an earlier picture and a prediction bloc from a later picture and assign different prediction weights for each of the prediction blocks.

Figure 4A:
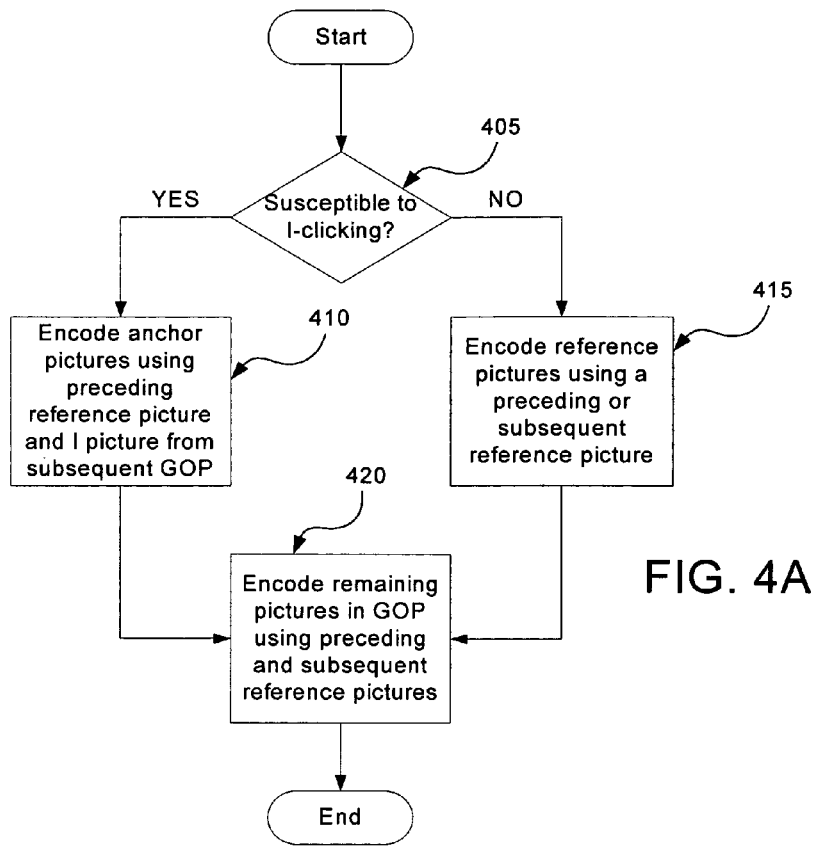
FIG. 4A illustrates a flow diagram of an exemplary method of encoding pictures in a linear GOP, in accordance with an embodiment of the present invention.
Figure 4B:
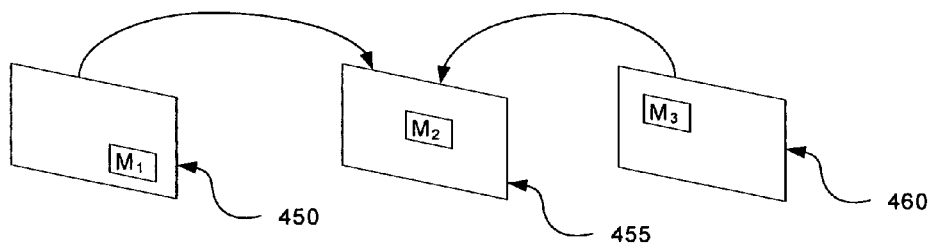
FIG. 4B illustrates a block diagram of exemplary coding of a macroblock using bi-prediction mode, in accordance with an embodiment of the present invention.

FIG. 4A illustrates a flow diagram of an exemplary method of encoding pictures in a linear GOP, in accordance with an embodiment of the present invention. At 405 it may be determined whether a picture contains content that may be susceptible to "I-clicking." If the picture contains content susceptible to "I-clicking," bi-prediction mode may be selected and at 410 anchor pictures may be temporally encoded utilizing the preceding reference picture from the same GOP associated with the anchor picture, and the first reference picture from the GOP following the GOP associated with the anchor picture. Thus, anchor pictures in a GOP may be encoded utilizing a prior reference picture in the GOP, where the prior picture may be an I picture or another anchor picture in the same GOP, and the I picture from the subsequent GOP. In bi-prediction mode, illustrated in FIG. 4B, macroblocks within a picture may be encoded using a macroblock from a previous picture and a macroblock from a subsequent picture. Each of the macroblocks used can be given a different weight corresponding to a combination that yields the most desirable result. For example, a macroblock $M_2$ in a picture 450 may be temporally encoded using bi-prediction mode, utilizing macroblock $M_1$ from a preceding picture 450 and a macroblock $M_3$ from a preceding picture 460, wherein different weights may be used with each macroblock as follows:

$$M_2 = w_1 M_1 + w_3 M_3$$

If the picture does not contain content susceptible to "I-clicking," regular prediction mode may be selected at 415 and reference pictures may be encoded utilizing other reference pictures within the GOP.

At 420, the remaining pictures in the GOP may be encoded utilizing the prior and subsequent reference pictures, which may be the I picture or anchor pictures from the same GOP, or the I picture from the subsequent GOP.

Figure 5:
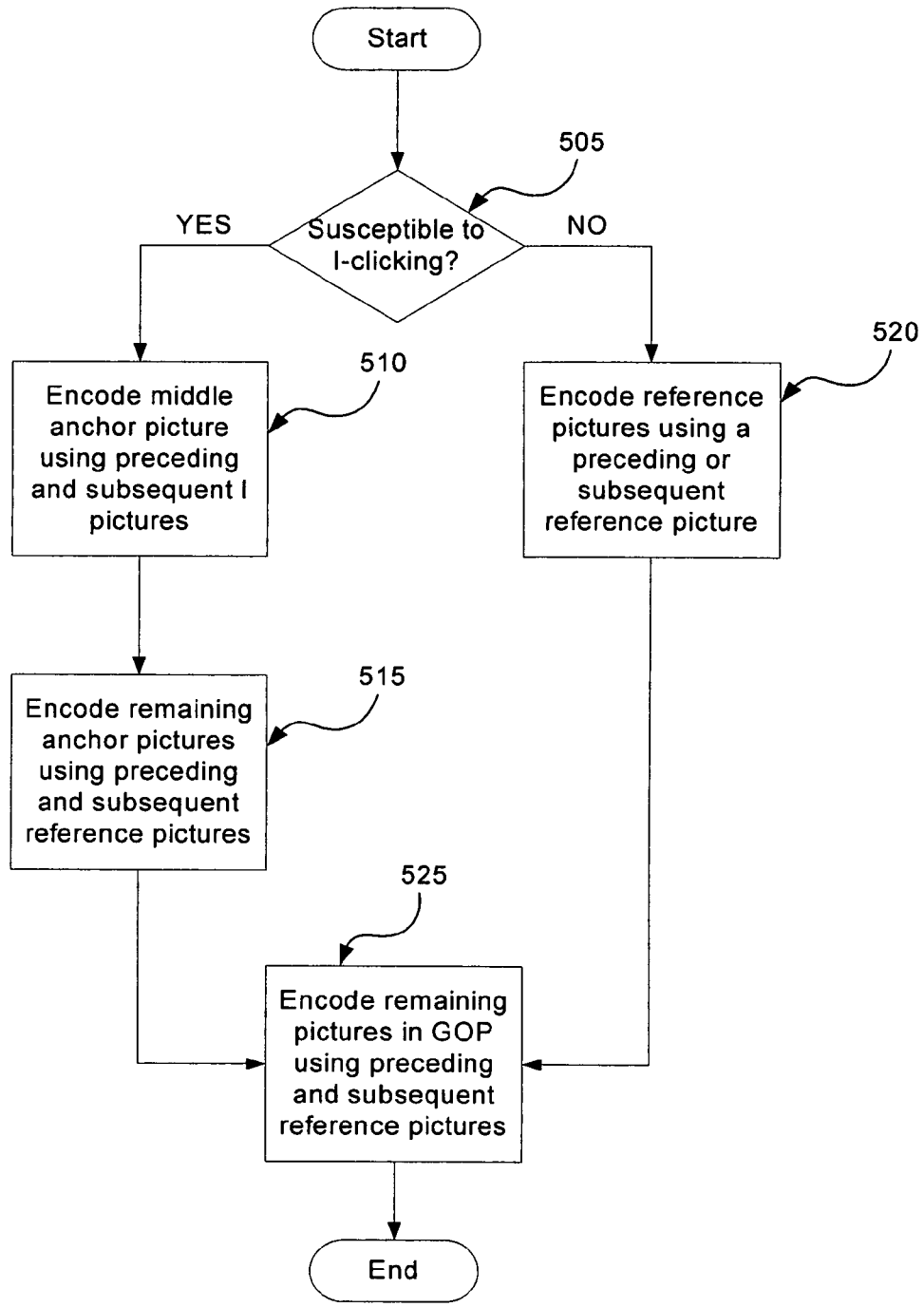
FIG. 5 illustrates a flow diagram of another exemplary method of encoding pictures in a multi-level GOP, in accordance with an embodiment of the present invention.

FIG. 5 illustrates a flow diagram of another exemplary method of encoding pictures in a multi-level GOP, in accordance with an embodiment of the present invention. At 505 it may be determined whether a picture contains content that may be susceptible to "I-clicking." If the picture contains content susceptible to "I-clicking," bi-prediction mode may be selected and at 510 an anchor pictures in the middle of the GOP may be temporally encoded utilizing the I picture from the same GOP and the I picture from the subsequent GOP. At 515 the remaining anchor pictures in the GOP may be temporally encoded utilizing the preceding and subsequent reference pictures, which may be I pictures from the same and the subsequent GOP, or other anchor pictures within the same GOP.

If the picture does not contain content susceptible to "I-clicking," regular prediction mode may be selected at 520 and reference pictures may be encoded utilizing other reference pictures within the GOP.

At 525, the remaining pictures in the GOP may be encoded utilizing the prior and subsequent reference pictures, which may be the I picture or anchor pictures from the same GOP, or the I picture from the subsequent GOP.

In an embodiment of the present invention, the methods described by FIG. 4 and FIG. 5 may be utilized at a macroblock level, where the content of a macroblock within the pictures may be classified as susceptible to "I-clicking" and based on the content classification, an prediction mode may be selected for encoding the macroblock.

Figure 6:
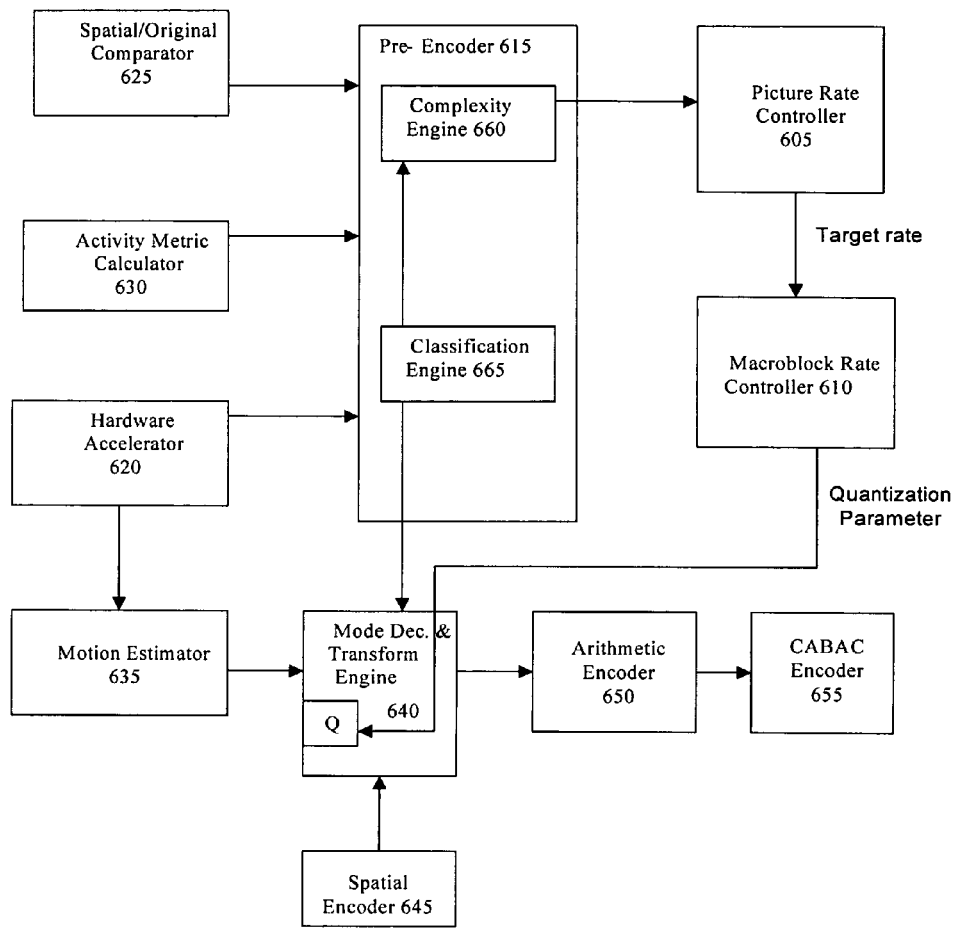
FIG. 6 illustrates a block diagram of an exemplary video encoder, in accordance with an embodiment of the present invention.

FIG. 6 illustrates a block diagram of an exemplary video encoder system 600, in accordance with an embodiment of the present invention. The system 600 comprises a picture rate controller 605, a macroblock rate controller 610, a pre-encoder 615, hardware accelerator 620, spatial from original comparator 625, an activity metric calculator 630, a motion estimator 635, a mode decision and transform engine 640, an arithmetic encoder 650, and a CABAC encoder 655.

The picture rate controller 605 may comprise software or firmware residing on a CPU. The macroblock rate controller 610, pre-encoder 615, spatial from original comparator 625, mode decision and transform engine 640, spatial predictor 645, arithmetic encoder 650, and CABAC encoder 655 may comprise software or firmware residing on the CPU. The pre-encoder 615 includes a complexity engine 660 and a classification engine 665.

In an embodiment of the present invention, the classification engine 665 may classify pictures according to their content. As a result, the classification engine 665 may indicate when a picture or a video sequence contains content susceptible to "I-clicking." The classification determined by the classification engine 665 may then be indicated to the mode decision and transform engine 640, which mainly determines the best mode for encoding a picture based on the input from the motion estimator 635, the spatial encoder 645, and the pre-encoder 615. Based on the classification of the content associated with a picture, the mode decision and transform engine 640 may determine whether a picture is to be encoded as an anchor picture.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for encoding a group of pictures, the method comprising:

encoding, using a circuit, a first secondary reference picture in the group of pictures utilizing a first primary reference picture and a second primary reference picture, where the first primary reference picture is associated with the group of pictures and the second primary reference picture is associated with a second group of pictures; and encoding a second secondary reference picture in the group of pictures utilizing an immediately preceding reference picture and the second primary reference picture, where the immediately preceding reference picture comprises one of the first primary reference picture or another secondary reference picture in the group of pictures.

2. The method according to claim 1, wherein the group of pictures comprises the first primary reference picture, a plurality of secondary reference pictures, and a plurality of predicted pictures.

3. The method according to claim 2, further comprising:

encoding a third secondary reference picture utilizing an immediately preceding reference picture and the second primary reference picture, wherein the preceding reference comprises one of the first primary reference picture or another secondary reference picture.

4. The method according to claim 2, wherein the second secondary reference picture is a middle secondary reference picture encoded utilizing the first primary reference picture and the second primary reference picture.

5. The method according to claim 3, further comprising:

encoding individual ones of the plurality of predicted pictures utilizing an immediately preceding reference picture and an immediately subsequent reference picture, wherein the immediately preceding reference picture comprises one of the first primary reference picture or a secondary reference picture, and the immediately subsequent reference picture comprises one of a secondary reference picture or the second primary reference picture.

6. The method according to claim 4, further comprising:
encoding a third secondary reference picture utilizing an immediately preceding reference picture and an immediately subsequent reference picture, wherein the immediately preceding reference picture comprises one of the first primary reference picture or another secondary reference picture, and the immediately subsequent reference picture comprises one of another secondary reference picture or the second primary reference picture.

7. The method according to claim 6, further comprising:
encoding each of the plurality of predicted pictures utilizing an immediately preceding reference picture and an immediately subsequent reference picture.

8. A non-transitory machine-readable storage having stored thereon, a computer program having at least one code section for encoding a group of pictures, the at least one code section being executable by a machine for causing the machine to perform steps comprising:
encoding a first secondary reference picture in the group of pictures utilizing a first primary reference picture and a second primary reference picture, where the first primary reference picture is associated with the group of pictures and the second primary reference picture is associated with a second group of pictures; and
encoding a second secondary reference picture in the group of pictures utilizing an immediately preceding reference picture and the second primary reference picture, where the immediately preceding reference picture comprises one of the first primary reference picture or another secondary reference picture in the group of pictures.

9. The non-transitory machine-readable storage according to claim 8, wherein the group of pictures comprises the first primary reference picture, a plurality of secondary reference pictures, and a plurality of predicted pictures.

10. The non-transitory machine-readable storage according to claim 9, the computer program further comprising:
code for encoding a third secondary reference picture utilizing an immediately preceding reference picture and the second primary reference picture, wherein the preceding reference comprises one of the first primary reference picture or another secondary reference picture.

11. The non-transitory machine-readable storage according to claim 9, wherein the second secondary reference picture is a middle secondary reference picture encoded utilizing the first primary reference picture and the second primary reference picture.

12. The non-transitory machine-readable storage according to claim 10, wherein the computer program further comprises:
code for encoding individual ones of the plurality of predicted pictures utilizing an immediately preceding reference picture and an immediately subsequent reference picture, wherein the immediately preceding reference picture comprises one of the first primary reference picture or a secondary reference picture, and the immediately subsequent reference picture comprises one of a secondary reference picture or the second primary reference picture.

13. The non-transitory machine-readable storage according to claim 11, wherein the computer program further comprises:
code for encoding a third secondary reference picture utilizing an immediately preceding reference picture and an immediately subsequent reference picture; and
code for encoding each of the plurality of predicted pictures utilizing an immediately preceding reference picture and an immediately subsequent reference picture, wherein the immediately preceding reference picture comprises one of the first primary reference picture or another secondary reference picture, and the immediately subsequent reference picture comprises one of another secondary reference picture or the second primary reference picture.

14. A system for encoding a group of pictures, the system comprising:
at least one processor capable of encoding a first secondary reference picture in the group of pictures utilizing a first primary reference picture and a second primary reference picture, where the first primary reference picture is associated with the group of pictures and the second primary reference picture is associated with a second group of pictures; and
the at least one processor capable of encoding a second secondary reference picture in the group of pictures utilizing an immediately preceding reference picture and the second primary reference picture, where the immediately preceding reference picture comprises one of the first primary reference picture or another secondary reference picture in the group of pictures.

15. The system according to claim 14, the group of pictures comprises the first primary reference picture, a plurality of secondary reference pictures, and a plurality of predicted pictures.

16. The system according to claim 15, wherein the at least one processor is capable of encoding a third secondary reference picture utilizing an immediately preceding reference picture and the second primary reference picture, wherein the preceding reference comprises one of the first primary reference picture or another secondary reference picture.

17. The system according to claim 15, wherein the second secondary reference picture is a middle secondary reference picture encoded utilizing the first primary reference picture and the second primary reference picture.

18. The system according to claim 16, wherein the at least one processor is capable of encoding individual ones of the plurality of predicted pictures utilizing an immediately preceding reference picture and an immediately subsequent reference picture, wherein the immediately preceding reference picture comprises one of the first primary reference picture or a secondary reference picture, and the immediately subsequent reference picture comprises one of a secondary reference picture or the second primary reference picture.

19. The system according to claim 17, wherein the at least one processor is capable of encoding a third secondary reference picture utilizing an immediately preceding reference picture and an immediately subsequent reference picture, wherein the immediately preceding reference picture comprises one of the first primary reference picture or another secondary reference picture, and the immediately subsequent reference picture comprises one of another secondary reference picture or the second primary reference picture.

20. The system according to claim 19, wherein the at least one processor is capable of encoding each of the plurality of predicted pictures utilizing an immediately preceding reference picture and an immediately subsequent reference picture.

* * * * *